United States Patent
Kang et al.

(10) Patent No.: US 12,220,636 B2
(45) Date of Patent: Feb. 11, 2025

(54) METHOD AND APPARATUS FOR TARGETING OBJECT IN GAME

(71) Applicant: NCsoft Corporation, Seoul (KR)

(72) Inventors: Hyun Ku Kang, Seongnam-si (KR);
Kyung Hwan Kim, Seongnam-si (KR);
Jong Soo Kim, Seongnam-si (KR);
Sung Heun Bae, Seongnam-si (KR);
Won Jong Son, Seongnam-si (KR);
Hwan Eui Yang, Seongnam-si (KR);
Yong Ki Lee, Seongnam-si (KR); Su Jae Lim, Seongnam-si (KR); Sung Won Jang, Seongnam-si (KR); Woo Young Cho, Seongnam-si (KR); Won Min Choi, Seongnam-si (KR); Jung Rok Choi, Seongnam-si (KR)

(73) Assignee: NCSOFT Corporation, Seoul (KR)

( * ) Notice: Subject to any disclaimer, the term of this patent is extended or adjusted under 35 U.S.C. 154(b) by 258 days.

(21) Appl. No.: 17/825,747

(22) Filed: May 26, 2022

(65) Prior Publication Data

US 2022/0379213 A1 Dec. 1, 2022

(30) Foreign Application Priority Data

May 28, 2021 (KR) .................... 10-2021-0068861

(51) Int. Cl.
*A63F 13/537* (2014.01)
*G06F 3/0482* (2013.01)
*G06F 3/0486* (2013.01)
*G06F 3/04883* (2022.01)

(52) U.S. Cl.
CPC .......... *A63F 13/537* (2014.09); *G06F 3/0482* (2013.01); *G06F 3/0486* (2013.01); *G06F 3/04883* (2013.01)

(58) Field of Classification Search
None
See application file for complete search history.

(56) References Cited

U.S. PATENT DOCUMENTS

2012/0322523 A1* 12/2012 Woodard ................ A63F 13/69
463/2

FOREIGN PATENT DOCUMENTS

| CN | 110354495 A | 10/2019 |
| CN | 111672119 A | 9/2020 |
| EP | 2 128 748 A2 | 12/2009 |
| EP | 2 128 748 A3 | 4/2015 |

(Continued)

OTHER PUBLICATIONS

Korean Patent Publication No. 1020190117908 English Machine Translation, Oct. 17, 2019, engpat.kipris.or.kr/pmt/patent/patentRTT.jsp (Year: 2019).*

(Continued)

*Primary Examiner* — Damon J Pierce
(74) *Attorney, Agent, or Firm* — Sughrue Mion, PLLC

(57) ABSTRACT

Provided is a method and an apparatus for targeting an object in a game. The method of targeting an object in a game includes: setting a center point of a first targeting area based on a first input from a user; displaying the first targeting area surrounded by a closed curve around the center point on a screen of a user terminal; displaying a list including at least one object located in the first targeting area on the screen; and moving the first targeting area based on a second input by the user received after the first input.

15 Claims, 13 Drawing Sheets

(56) References Cited

FOREIGN PATENT DOCUMENTS

| JP | 6869412 B1 | 5/2021 |
|---|---|---|
| KR | 10-1417947 B1 | 9/2014 |
| KR | 10-2014-0144813 A | 12/2014 |
| KR | 10-1493507 B1 | 2/2015 |
| KR | 10-2019-0117908 A | 10/2019 |
| KR | 10-2227330 B1 | 3/2021 |
| WO | 2020/096080 A1 | 5/2020 |

OTHER PUBLICATIONS

Intention to Grant issued Jan. 23, 2024 in European Application No. 22 174 062.4.
Extended European Search Report issued Nov. 8, 2022 in Application No. 22174062.4.
Decision to Grant a Patent issued Sep. 26, 2023 in Japanese Application No. 2022-078697.
Office Action issued Jun. 6, 2023 in Japanese Application No. 2022-078697.
Nik Mann, "Mobile Suit Gundam Gundam Vs. Gundam", Monthly Arcadia, Incorporated, Jul. 1, 2008, vol. 9, No. 7, p. 38 (3 pages).
Written Decision on Registration issued Feb. 22, 2024 in Korean Application No. 10-2021-0068861.
Office Action Issued in Dec. 16, 2022 in Taiwanese Application No. 111113090.

\* cited by examiner

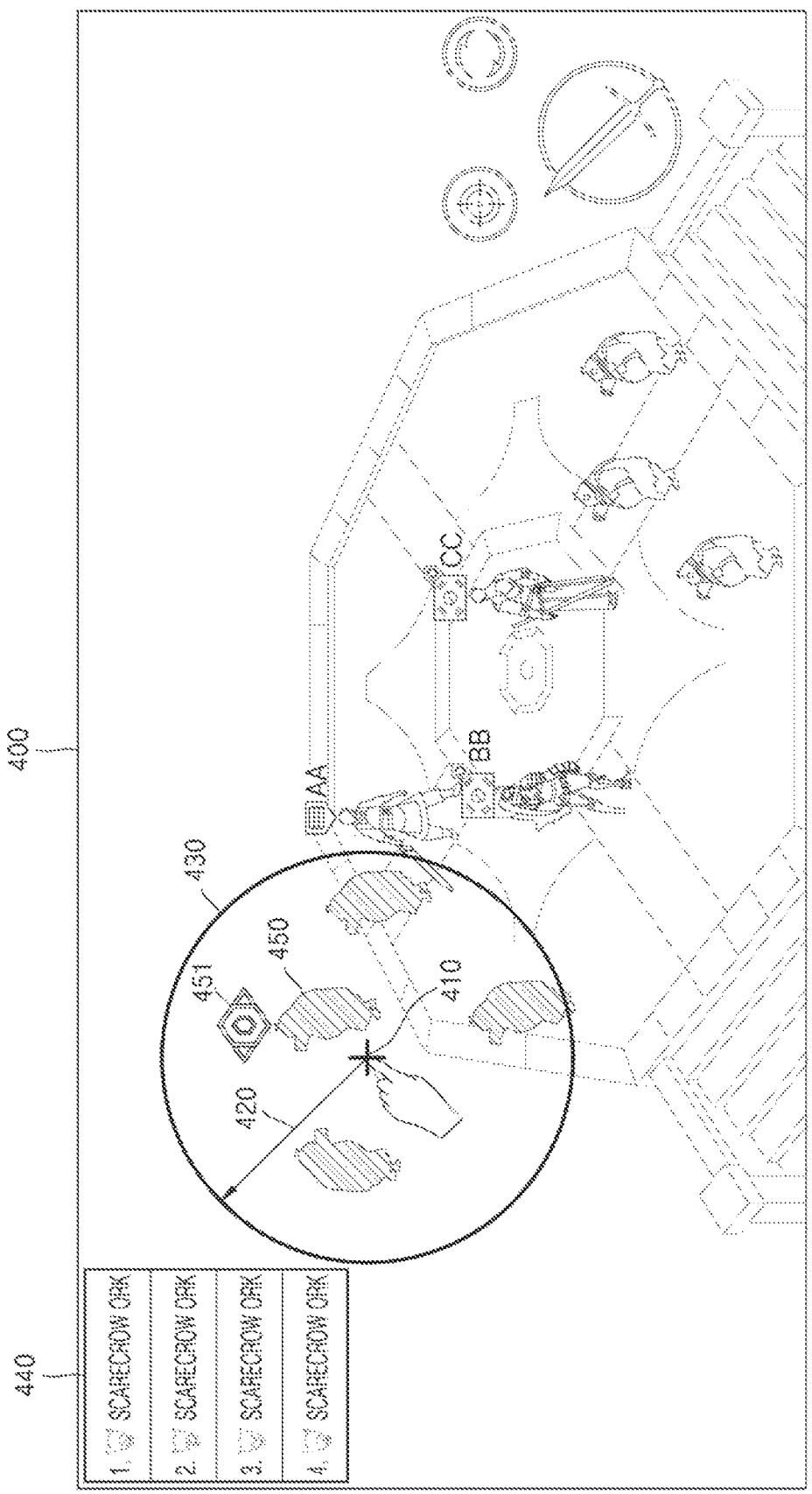

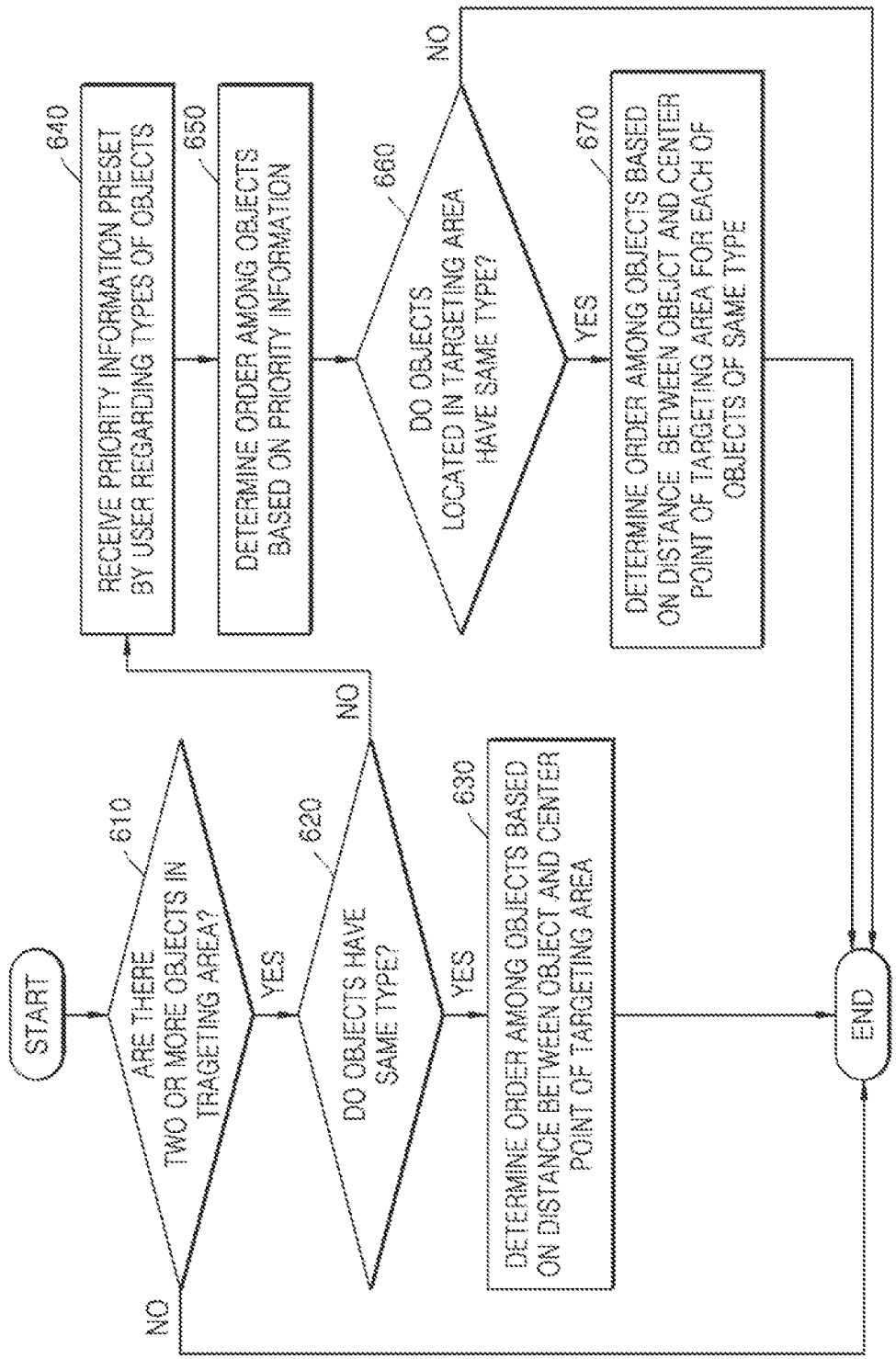

METHOD AND APPARATUS FOR TARGETING OBJECT IN GAME

CROSS-REFERENCE TO RELATED APPLICATION

This application is based on and claims priority under 35 U.S.C. § 119 to Korean Patent Application No. 10-2021-0068861, filed on May 28, 2021, in the Korean Intellectual Property Office, the disclosure of which is incorporated by reference herein in its entirety.

BACKGROUND

1. Field

The present disclosure relates to a method and an apparatus for targeting an object in a game.

2. Description of the Related Art

According to advances in computing devices and network environment, users playing online games through various wired or wireless communication devices have been remarkably increased. The users may enjoy the games through a wired or wireless communication device by playing a character in a game environment provided by a game server.

A role playing game (RPG) is a game in which multiple terminal users connected via internet use virtual characters to take on a mission or play a role, etc. Furthermore, an RPG in which numerous users are simultaneously participate is called a massively multiplayer online role playing game (MMORPG). Unlike a single play RPG which is characterized by a story or a degree of freedom in the game, an MMORPG focuses on interactions among users, such as a large-scale siege warfare, a party-play, etc.

In such online games, users may use their characters to combat against other users' characters or a non-player character (NPC) or go hunting. At this time, determining an attack target by an input signal from a user is called targeting.

The forgoing background is technical information the inventor has known to derive the present disclosure or has learned in the process of deriving the present disclosure, and thus is not necessarily deemed as a prior art disclosed to general public prior to the filing of the present disclosure.

SUMMARY

Provided are methods and apparatuses for targeting objects in a game.

The technical objectives the present disclosure aims to achieve are not limited to the foregoing, and other technical objectives and advantages, which are not mentioned herein may be understood more clearly through the following descriptions and embodiments. Furthermore, it will be understood that the technical objectives and advantages sought to be achieved by the present disclosure can be implemented by methods described in the scope of claims and a combination thereof.

Additional aspects will be set forth in part in the description which follows and, in part, will be apparent from the description, or may be learned by practice of the presented embodiments of the disclosure.

According to an aspect of an embodiment, a method of targeting an object in a game includes: setting a center point of a first targeting area based on a first input from a user; displaying the first targeting area surrounded by a closed curve around the center point on a screen of a user terminal; displaying a list including at least one object located in the first targeting area on the screen; and moving the first targeting area based on a second input by the user received after the first.

The first input may be a long-press input made by touching a first position on the screen over preset time, and the first targeting area may be an area surrounded by a circular closed curve apart from the first position, as a center point, at a first distance.

The method may further include displaying on the screen a second targeting area, which is an area moved in parallel with the first targeting area, wherein the second input is an input of dragging on the screen a touch point to a second position, which is different from the first position, and the second targeting area is an area surrounded by a circular closed curve apart from the second position, as a center point, at the first distance.

The method may further include, when the second input is finished, automatically attacking at least one object included in the second targeting area, wherein the second input is finished when a touch on the screen is released during the input of dragging.

The displaying of the list on the screen may include: when two or more objects are located in the first targeting area, receiving priority information preset by the user regarding types of the objects; determining an order among the objects based on the priority information; and displaying the list based on the determined order.

The determining of the order may include, when objects of a same type are located in the first targeting area, determining the order with respect to each of the objects of the same type based on a distance between each object and the center point.

The method may further include: displaying the at least one object located in the first targeting area by changing a color thereof to be distinguished from objects which are not located in the first targeting area; and marking a position adjacent to a first object having a highest priority among the at least one object with a shape distinguishable from a shape of the first object.

According to an aspect of another embodiment, an apparatus executing a game includes: a memory in which at least one program is stored; and a processor configured to execute an operation by running the at least one program, wherein the processor is configured to set a center point of a first targeting area based on a first input from a user; display the first targeting area surrounded by a closed curve around the center point on a screen of a user terminal; display a list including at least one object located in the first targeting area on the screen; and move the first targeting area based on a second input by the user received after the first input.

According to an aspect of another embodiment, provided is a computer-readable record medium in which a program for executing the aforementioned method in a computer is recorded.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 4A is a diagram illustrating an example of displaying a targeting area;

FIG. 6 is a flowchart illustrating an example of determining an order among objects located in a targeting area;

DETAILED DESCRIPTION

Figure 1:
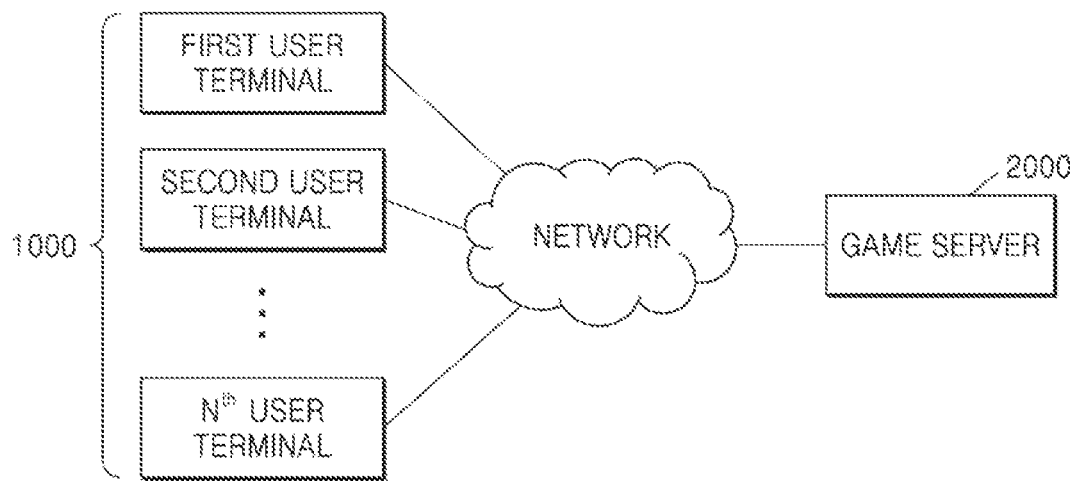
FIG. 1 is a diagram illustrating an example of a system including a user terminal and a game server.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

The advantages and features of the present disclosure, as well as the methods to achieve them will become apparent with reference to the below embodiments described in detail along with the accompanying drawings. However, the present disclosure is not limited by the embodiments described below, and may be implemented in various forms. Accordingly, the present disclosure should be construed as including all modifications, equivalents, and substitutions within the technical scope of the present disclosure.

The terms used in the present specification are merely used to describe exemplary embodiments, and are not intended to limit technical ideas. An expression used in the singular encompasses the expression of the plural, unless it has a clearly different meaning in the context. In the present specification, it is to be understood that the terms such as "including," "having," and "comprising" are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

Some embodiments of the present disclosure may be expressed as functional block components and various processing operations. Some or all of such functional block components may be implemented by various numbers of hardwares and/or softwares performing particular functions. For example, the functional blocks of the present disclosure may be implemented by one or more microprocessors, or circuits configured to perform certain functions. Moreover, for example, the functional blocks of the present disclosure may be implemented by various programming or scripting languages. The functional blocks may be implemented by an algorithm executed in one or more processors. Furthermore, the present disclosure may employ related arts for electronic environment configuration, signal processing, and/or data processing, etc. The terms "mechanism," "elements," "tools," "components," etc. may be used in comprehensive sense, and not limited to mechanical and physical components.

Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device.

Hereinafter, operations performed by a user may mean operations performed by a user through a user terminal. For example, through an input device embedded in or additionally connected to a user terminal (e.g., a keyboard, a mouse, etc.), a command corresponding to an operation performed by a user may be input to the user terminal. Also, through a touch screen of the user terminal, a command corresponding to an operation performed by a user may be input to the user terminal. At this time, the operation performed by the user may include certain gestures. For example, the gestures may include a tap, a touch & hold, a double tap, a drag, a panning, a flick, a drag & drop, etc.

Embodiments will now be described more fully with reference to the accompanying drawings.

FIG. 1 is a diagram illustrating an example of a system including a user terminal 1000 and a game server 2000.

The system according to an embodiment may include the user terminal 1000 and the game server 2000.

The user terminal 1000 may communicate with another user terminal or other nodes.

The user terminal 1000 may be a smartphone, a tablet personal computer (PC), a PC, a smart TV, a mobile phone, a lap top, and other mobile or non-mobile computing devices. The user terminal 1000 may be a wearable device, such as glasses, a hair band, etc., with a communication function and data processing function. The user terminal 1000 may include all kinds of devices capable of performing communication with other devices through a network.

For example, the user terminal 1000 may include a touch screen, and thus include a touch input tool. The touch screen may refer to a screen through which certain information is input by a gesture of a user, and the gesture of a user may include a tap, a double tap, a press (touch & hold), a long-press, a drag, a panning, a flick, a drag & drop, a release, etc.

The game server 2000 may be implemented by a computing device or a plurality of computing devices which provide a command, a code, a file, contents, a service, etc. through communication via a network.

The user terminal 1000 and the game server 2000 may perform communication through a network. The game server 2000 may receive and transmit game data with the user terminal 1000 through a network and provide a system in which a user may play a game through the user terminal 1000.

The user terminal 1000 may be connected to the game server 2000 through a game application and a game execution program installed in the user terminal 1000. Furthermore, the user terminal 1000 may be connected to the game server 2000 through a web-based game streaming platform. However, the method of connecting to the game server 2000 is not limited thereto.

Meanwhile, a user of the user terminal 1000 may use a player character to combat against another user's character or a non-player character (NPC), or carry out a hunt. At this time, determining a target to be attacked by an input signal from the user may be defined as targeting.

A target may refer to an object a user's player character may attack, among objects that appear in a game. For example, the target may be a monster or a character controlled by another user, which appear in a game, and may include without limit any target the user's character may attack.

In a game to which numbers of users are connected, various types of objects may appear in a field displayed on a screen. For example, objects of various types, including a blood alliance member, a rival alliance member, a monster, an NPC, etc. may appear simultaneously on a screen.

Accordingly, targeting accurately an object a user's character intends to attack among various objects on a screen may be an important factor in playing a game. Moreover, when a team combat in which both of blood alliance members and rival alliance members participate takes place, a quick attack may be required, and thus minimizing a flow of movement for targeting may also be an important factor.

The network may include a local area network (LAN), a wide area network (WAN), a value added network (VAN), a mobile radio communication network, a satellite communication network, and a combination thereof, and may refer to a data network in a comprehensive sense, which facilitates communication among subjects constituting the respective networks illustrated in FIG. 1, including a wired internet, a wireless internet, and a mobile wireless communication network. Furthermore, the wireless communication may include Wireless-Fidelity (Wi-Fi), Bluetooth, Bluetooth low energy, Zigbee, Wi-Fi Direct (WFD), ultra wideband (UWD), infrared data association (IrDA), near field communication (NFC), etc.; however, the present discourse is not limited thereto.

Figure 2:
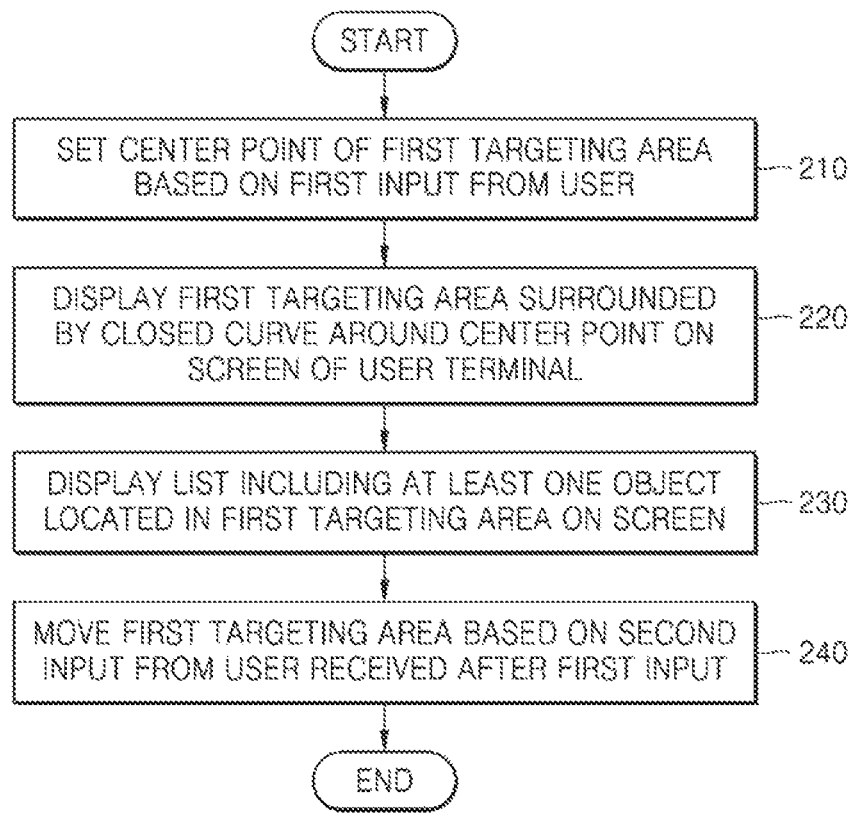
FIG. 2 is a flowchart illustrating an example of a method of targeting an object in a game.

FIG. 2 is a flowchart illustrating an example of a method of targeting an object in a game.

With reference to FIG. 2, the method of targeting an object in a game may include operations processed time-sequentially in the user terminal 1000 or the game server 2000 of FIG. 1.

In operation 210, the user terminal 1000 may set a center point of a first targeting area based on a first input from a user.

The first input may be a preset input of one of gestures which a user may input through a touch input tool, and may be set to be a gesture distinguished from other input commands for game playing. For example, the first input may be a long-press input, which is a touch on a first position on the screen of the user terminal 1000 over preset time; however, the present disclosure is not limited thereto.

That is, when the first input is received at a position which does not affect other user interface (UI) menus on the screen of the user terminal 1000, the user terminal 1000 may perceive the first input as an input instructing setting of a center point of a targeting area. When a long-press input made by touching the first position is received, the user terminal 1000 may set the first position as a center point of a targeting area.

In operation 220, the user terminal 1000 may display the first targeting area surrounded by a closed curve around the center point on the screen of the user terminal 1000.

The first targeting area may be an area surrounded by a closed curve around the center point. For example, when a long-press input made by touching the first position is received, the first targeting area may be an area surrounded by a circular closed curve apart from the first position, as the center point, at a first distance; however, the present disclosure is not limited thereto.

Meanwhile, the first distance may have a value preset by a user of the user terminal 1000. The user may adjust a size of the targeting area according to a strategy in playing the game, and the size of the targeting area may be adjusted by varying the first distance.

Figure 3:
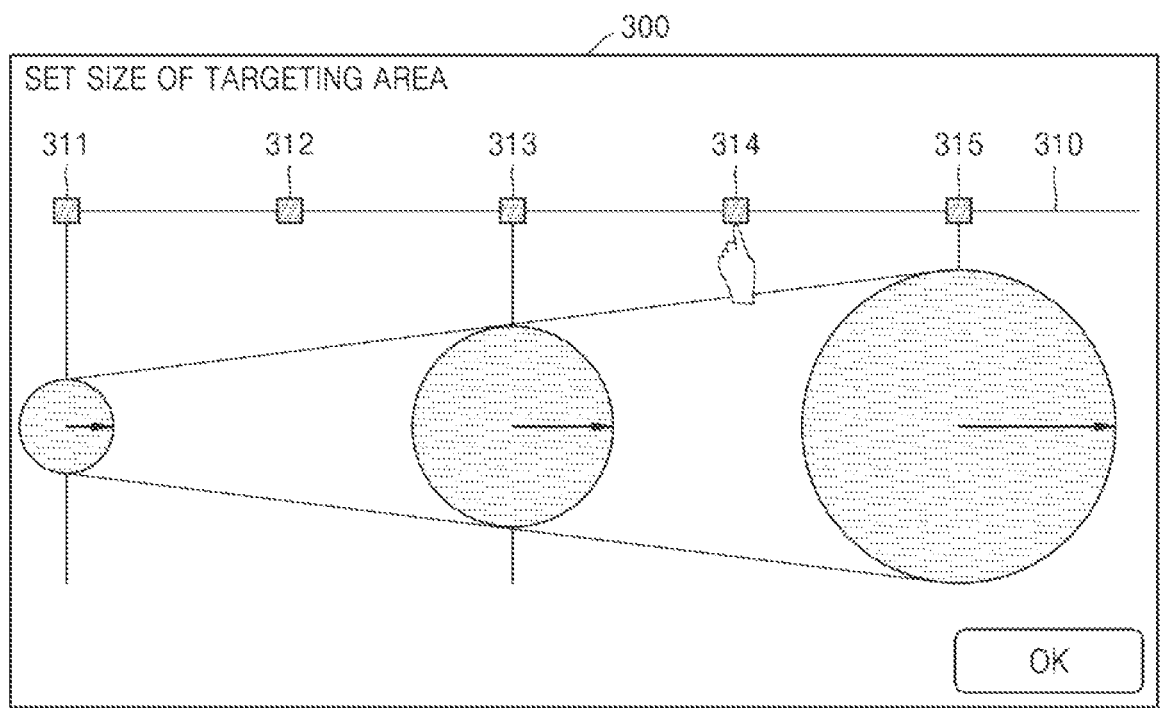
FIG. 3 is a diagram illustrating an example of setting a size of a targeting area.

FIG. 3 is a diagram illustrating an example of setting a size of a targeting area.

With reference to FIG. 3, the user may adjust the first distance in a setting screen 300 on which the user may adjust the size of the targeting arear.

For example, the user may tap on any one point from among a point for a shortest first distance to a point for a greatest first distance 311 to 315 on a bar 310 which appears on the setting screen 300 to adjust the first distance.

When the user clicks an OK button after selecting any one point, the size of the targeting area may be determined based on the first distance set by the user.

As described above, the size of the targeting area may be determined based on the first distance preset by the user, but the user may also adjust the size of the targeting area in real-time. For example, after a long-press input made by touching the first position, the user may maintain the touching while simultaneously adjusting the size of the targeting area in real-time using a wheel of a mouse. However, there may be various other methods to adjust the size of the targeting area in real-time, and the present disclosure is not limited thereto.

Referring back to FIG. 2, in operation 230, the user terminal 1000 may display a list including at least one object located in the first targeting area on the screen.

For example, the list may include all objects located in the first targeting area. Alternatively, the list may only include N objects (N is a natural number) among objects included in the first targeting area in order of priority.

When two or more objects are located in the first targeting area, the user terminal 1000 may receive priority information preset by the user regarding types of the objects. The user terminal 1000 may determine an order among the objects based on the priority information and display a list based on the determined order.

At this time, the order among the objects may mean an order of attack by the user character; however, the present disclosure is not limited thereto, and the order may refer to an order of performing play commands other than an attack.

The method of determining an order among objects located in the first targeting area is described later with reference to FIGS. 6 to 10.

FIG. 4A is a diagram illustrating an example of displaying a targeting area.

According to an embodiment, when the user makes a gesture for the first input at the first position, the first targeting area may be formed based on the first position.

With reference to FIG. 4A, when the user performs a long-press input at a first position 410 on a screen 400 of the user terminal 1000, a first targeting area 430 surrounded by a circular closed curve apart from the first position 410 at a first distance 420 may be displayed.

Moreover, a list 440 including at least one object located in the first targeting area 430 may be displayed on a part of the screen 400. When two or more objects are located in the first targeting area 420, an order among the objects may be determined according to priority, and the list 440 may be displayed based on the determined order.

Meanwhile, according to an embodiment, at least one object included in the first targeting area 430 may be displayed in a different color so that they may be distinguished from objects which are not located in the first targeting area 430. Moreover, objects included in the first targeting area 430 may be displayed in different colors based on their types. For example, a blood alliance member, a rival alliance member, or a special NPC included in the first targeting area 430 may be displayed in different colors based on their types.

Also, according to an embodiment, a position adjacent to a first object 450 having the highest priority in the list 440 may be marked with a shape distinguishable from a shape of the first object 450. The shape distinguishable from a shape of an object may be any shape by which a user may notice that an object adjacent to such distinguishable shape is a first object to be attacked by a user character.

According to an embodiment, when the user is finished with the first input, the first targeting area 430 may disappear from the screen 400 of the user terminal 1000. Furthermore, at the same time when the user finishes the first input, an attack on at least one object included in the list 440 may be automatically performed.

Figure 4B:
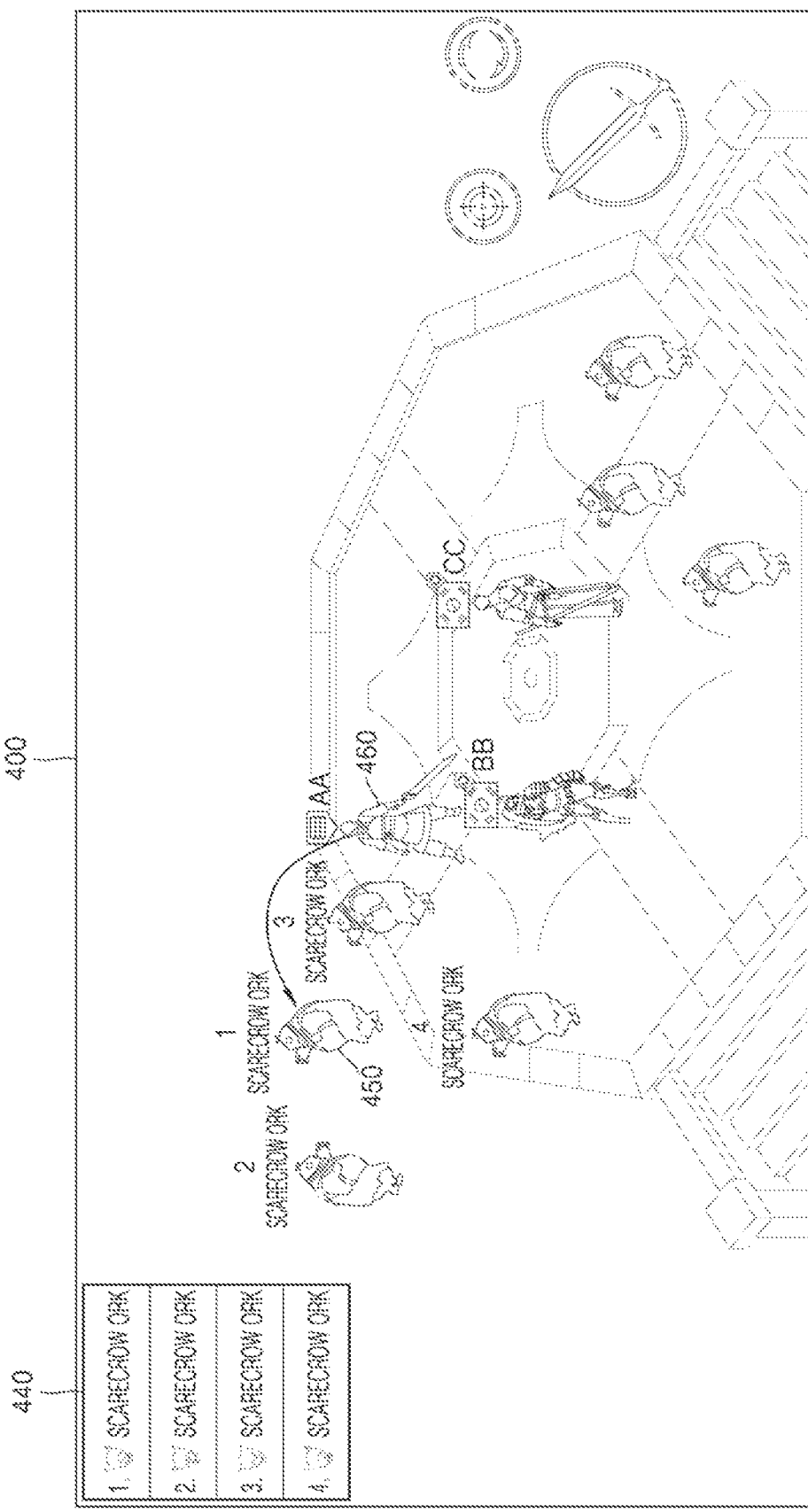
FIG. 4B is a diagram illustrating an example of attacking an object when a first input is finished.

FIG. 4B is a diagram illustrating an example of attacking an object when a first input is finished.

For example, when the user releases a touch on the screen 400 of the user terminal 1000 during a long-press input, the first input may be finished. With reference to FIG. 4B, when the user releases a touch on the screen 400 of the user terminal 1000, without an additional operation by the user, a user character 460 may automatically attack at least one object included in the list 440.

Meanwhile, the attack may be performed based on an order among objects displayed in the list 440. With reference to FIG. 4B, an attack order among the objects included in the list 440 may be shown above a shape of each object. For example, the user character 460 may firstly attack the first object 450 which is the first in the attack order.

As such, as the targeting area is formed based on the first input from the user, and the attack is automatically performed without a further operation of the user based on the order among the objects located in the targeting area, the accuracy in targeting may be improved, and the flow of movement may also be minimized, which leads to a higher efficiency.

Meanwhile, given the nature of a massively multiplayer online role playing game (MMORPG) in which numerous players are simultaneously connected to and play a RPG, objects may move in real-time, and the user of the user terminal 1000 may fail to set a targeting area so that an object the user intends to attack is located in the targeting area. In such a case, the user may perform a second input before the first input is finished to move the first targeting area to a desired position.

Referring back to FIG. 2, in operation 240, the user terminal 1000 may move the first targeting area based on the second input by the user received after the first input.

According to an embodiment, the second input may refer to an input of dragging from the first position, which is the center point of the first targeting area, to the second position, which is different from the first position. For example, the second input may be an input performed before the first input is finished. That is, when the user performs the second input before releasing a touch on the screen of the user terminal 1000 during the first input, the first targeting area may be moved based on the second input.

For example, the second input may be an input of dragging from the first position to the second position, which is different from the first position, on the screen of the user terminal 1000. When the second input by the user is received after the first input, the user terminal 1000 may display a second targeting area on the screen of the user terminal 1000 by moving the first targeting area in a parallel manner. The second targeting area may be an area surrounded by a circular closed curve apart from the second position, as a center point, at the first distance.

Figure 5A:
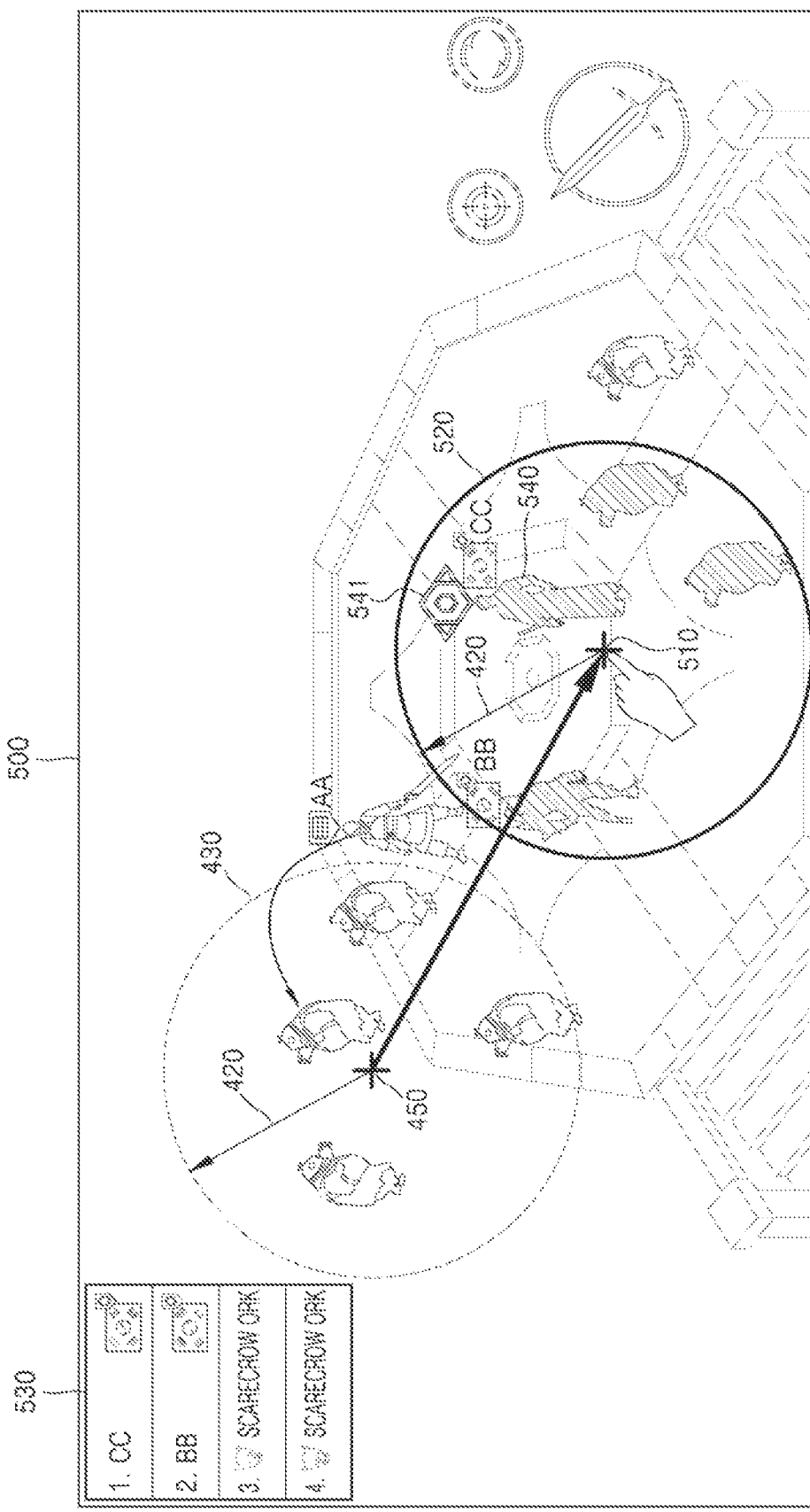
FIG. 5A is a diagram illustrating an example of moving a targeting area in real-time.

FIG. 5A is a diagram illustrating an example of moving a targeting area in real-time.

With reference to FIG. 4A, although the user intends to attack a character named BB or a character named CC which are members of a rival alliance, as BB or CC moves in real-time, BB or CC may not be located in the first targeting area 430.

In such a case, with reference to FIG. 5A, the user may perform a long-press input on the first position 410 and while maintaining the touching, the user may perform a drag input to move the touch position from the first position 410 to a second position 510.

The center point of the first targeting area 430 may move from the first position 410 to the second position 510, and accordingly, the first targeting area 430 may move in a parallel manner, and a second targeting area 520 may be displayed on a screen 500 of the user terminal 1000. The second targeting area 520 may be an area surrounded by a circular closed curve apart from the second position 510 of the second targeting area 520 at the first distance 420.

Accordingly, a character named AA and a character named BB which are members of a rival alliance may be included in the second targeting area 520. Thus, the user may target a desired object by moving a targeting area through a simple drag input without resetting the targeting area from the first.

Similarly, the user terminal 1000 may display a list 530 including at least one object located in the second targeting area 520 on a part of the screen 500. When two or more objects are located in the second targeting area 520, an order among the objects may be determined based on priority, and the list 530 may be display based on the determined order.

Furthermore, according to an embodiment, a position adjacent to a character named CC which is a first object 540 having the highest priority in the list 530 may be marked with a shape 541 distinguishable from a shape of the character named CC.

Figure 5B:
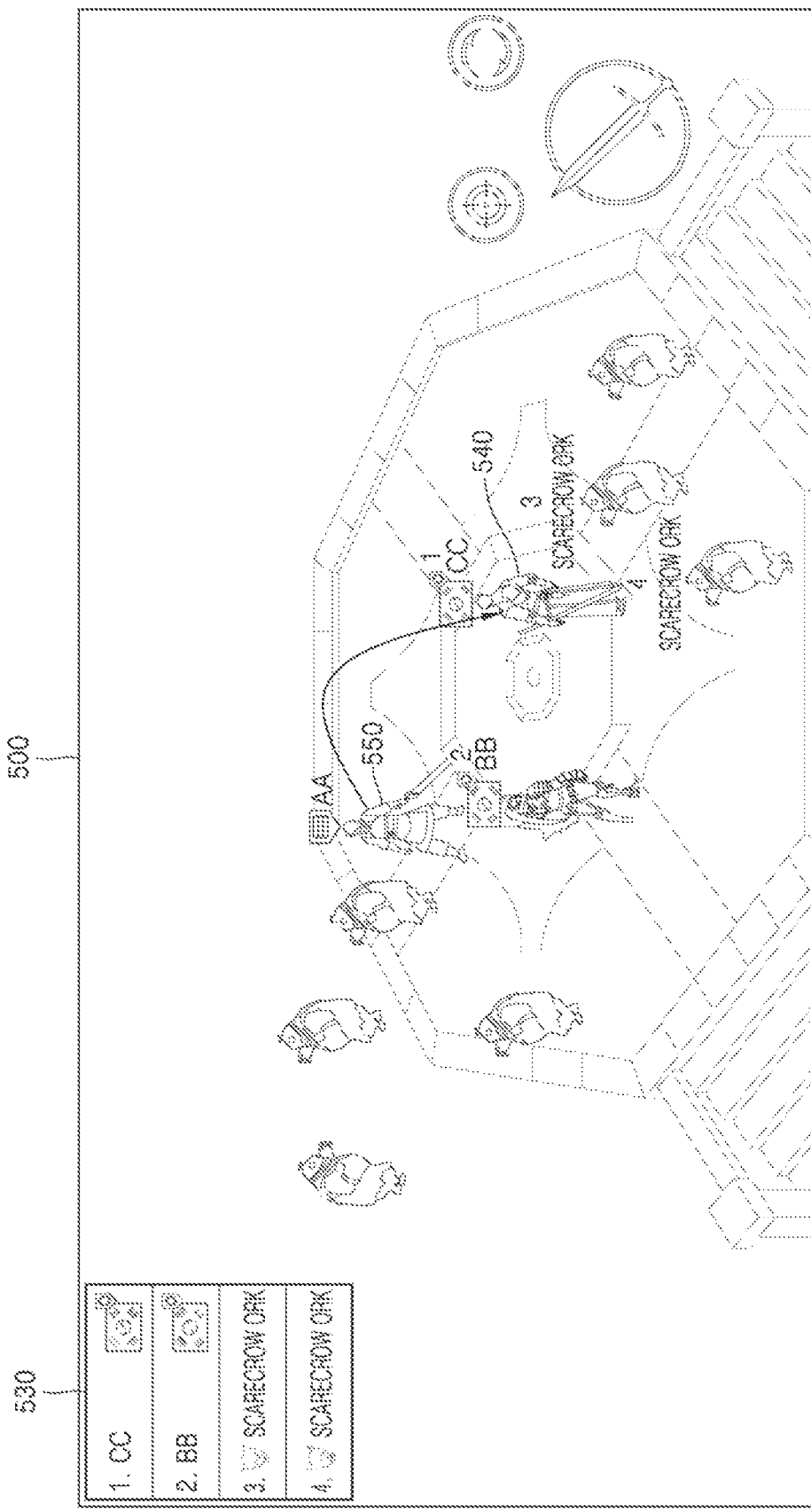
FIG. 5B is a diagram illustrating an example of attacking an object when a first input is finished.

FIG. 5B is a diagram illustrating an example of attacking an object when a first input is finished.

According to an embodiment, when the user is finished with the second input, the second targeting area 520 may disappear from the screen 500 of the user terminal 1000. Moreover, at the same time when the user finishes the second input, an attack on at least one object included in the list 530 may be automatically performed. For example, during when the user performs a drag input, and the touch on the screen 500 of the user terminal 1000 is released, the second input may be finished.

With reference to FIG. 5B, when the user releases a touch on the screen 500 of the user terminal 1000, without an additional operation by the user, a user character 550 may automatically attack at least one object included in the list 530. For example, the user character 550 may first attack the character named CC, which is the first object 540 having the highest priority among object included in the list 530.

FIG. 6 is a flowchart illustrating an example of determining an order among objects located in a targeting area.

With reference to FIG. 6, in operation 610, the user terminal 1000 may determine whether two or more objects are located in a targeting area. When less than two objects is located in the targeting area, determining an order among objects located in the targeting area may be terminated. When two or more objects are located in the targeting area, operation 610 may proceed to operation 620.

In operation 620, the user terminal 1000 may determine whether the objects have the same type. When the objects have the same type, operation 620 may proceed to operation 630, and when the objects have different types, operation 620 may proceed to operation 640.

In operation 630, the user terminal 1000 may determine an order among the objects based on a distance between the object and the center point of the targeting area. For example, the less a distance between an object and the center point of the targeting area is, the higher priority the object may have.

Figure 7:
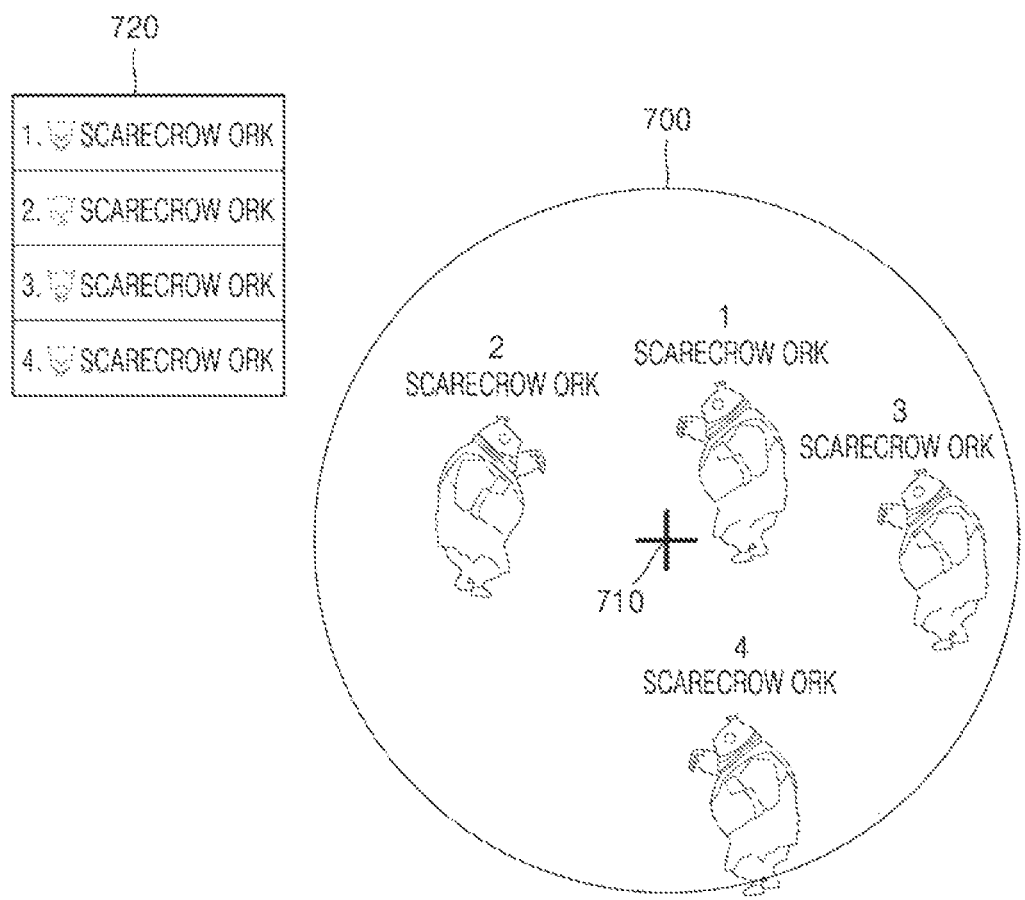
FIG. 7 is a diagram illustrating an example of, when objects located in a targeting area are of the same type, determining an order among the objects.

FIG. 7 is a diagram illustrating an example of, when objects located in a targeting area are of the same type, determining an order among the objects.

With reference to FIG. 7, objects located in a targeting area 700 may all be of the same type of NPC, i.e., a scarecrow ork. Accordingly, the user terminal 1000 may compare a distance between a center point 710 of the targeting area 700 and each of the objects located in the targeting area 700. With reference to a list 720 including objects located in the targeting area 700, an order may be determined so that an object closest to the center point 710 has the highest priority.

Referring aback to FIG. 6, in operation 640, the user terminal 1000 may receive priority information preset by the user regarding types of the objects. For example, the objects may have various types, including a blood alliance member, a rival alliance member, a monster, an NPC, etc.

Figure 8:
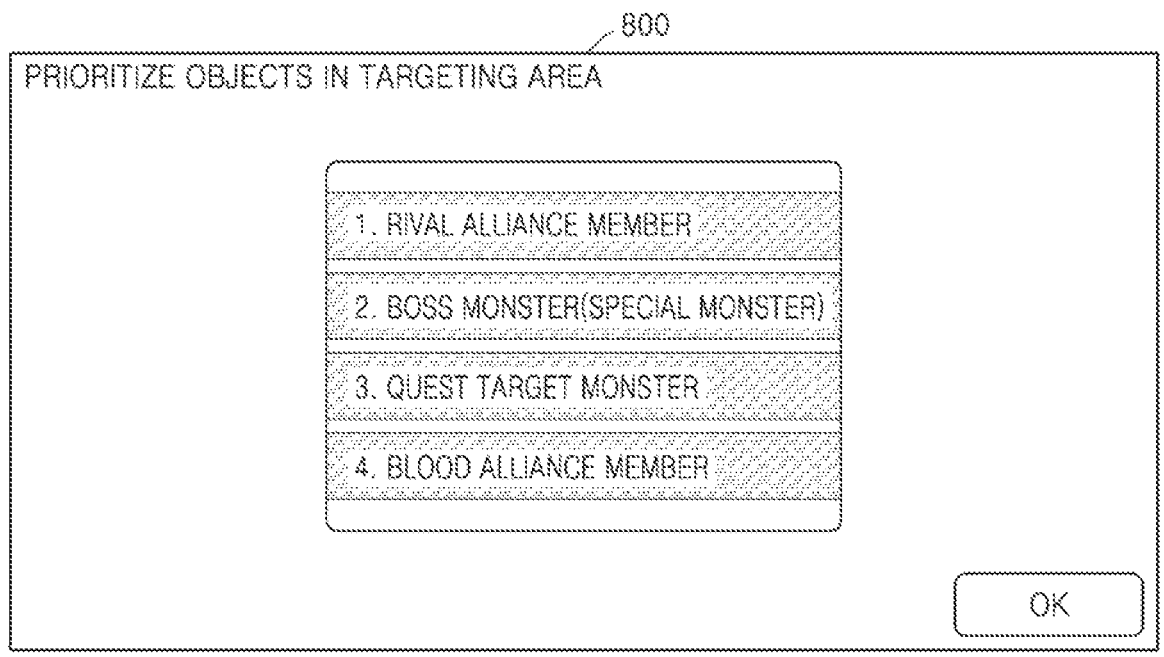
FIG. 8 is a diagram illustrating an example of prioritizing types of objects by a user.

FIG. 8 is a diagram illustrating an example of prioritizing types of objects by a user.

With reference to FIG. 8, the user may prioritize types of objects on a screen 800 for setting priority among objects located in a targeting area. Meanwhile, FIG. 8 illustrates only an example of setting priority of each type of objects, and the present disclosure is not limited thereto.

For example, types of objects which may be prioritized may include a rival alliance member, a blood alliance member, a boss monster (special monster), and a quest target monster. The user may prioritize the rival alliance member, the boss monster (special monster), the quest target monster and the blood alliance member, from highest and to lowest, and click the OK button. In such a case, an order among objects in the targeting area may be determined based on the priority information preset by the user.

Referring back to FIG. 6, in operation 650, the user terminal 1000 may determine an order among the objects based on priority information.

Furthermore, in operation 660, the user terminal 1000 may determine whether objects located in the targeting area have the same type. When it is determined that the objects located in the targeting area have different types, as the order among the objects has already been determined in operation 650, the determining of order may be terminated. When it is determined that the objects located in the targeting area have the same type, operation 660 may proceed to operation 670.

In operation 650, the user terminal 1000 may determine an order among the objects based on a distance between the center point of the targeting area and each of the objects of the same type.

Figure 9:
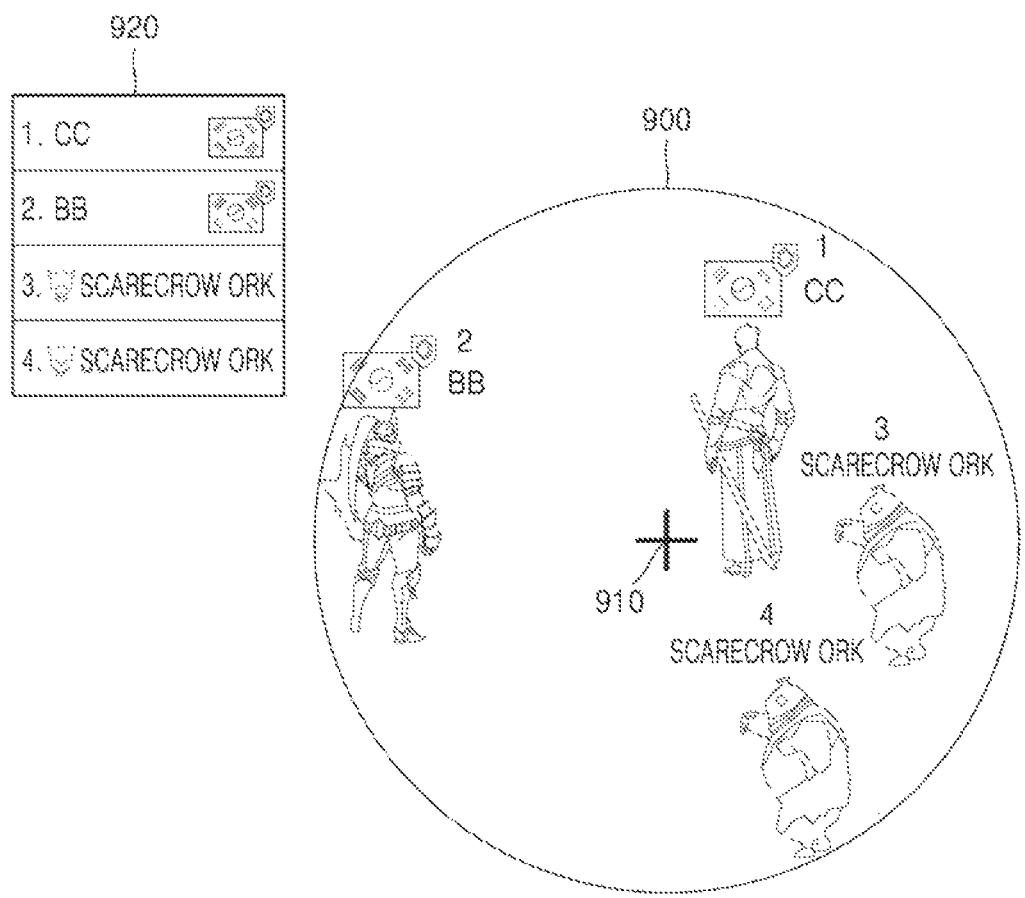
FIG. 9 is a diagram illustrating an example of, when objects located in a targeting area are of different types, determining an order among the objects.

FIG. 9 is a diagram illustrating an example of, when objects located in a targeting area are of different types, determining an order among the objects.

With reference to FIG. 9, objects located in a targeting area 900 may be a character named BB, a character named CC, which are members of a rival alliance, and scarecrow orks, which are NPCs. As described above with reference to FIG. 8, when the user prioritizes the rival alliance member, the boss monster (special monster), the quest target monster and the blood alliance member, from highest and to lowest, the character named BB and the character named CC, which are members of a rival alliance may have higher priority than the scarecrow orks, which are NPCs.

At this time, a distance between a center point 910 of the targeting area 900 and each of the character named BB and the character named CC, which are of the same type, may be compared. As the character named CC is closer to the center point 910 than the character named BB is, the character named CC may have the higher priority than the character named BB. Also, a distance between the center point 910 and each of the scarecrow orks, which have the same type, i.e, the NPCs, may be compared. Finally, an order among the objects located in the targeting area 900 may be determined as described in a list 920.

Figure 10:
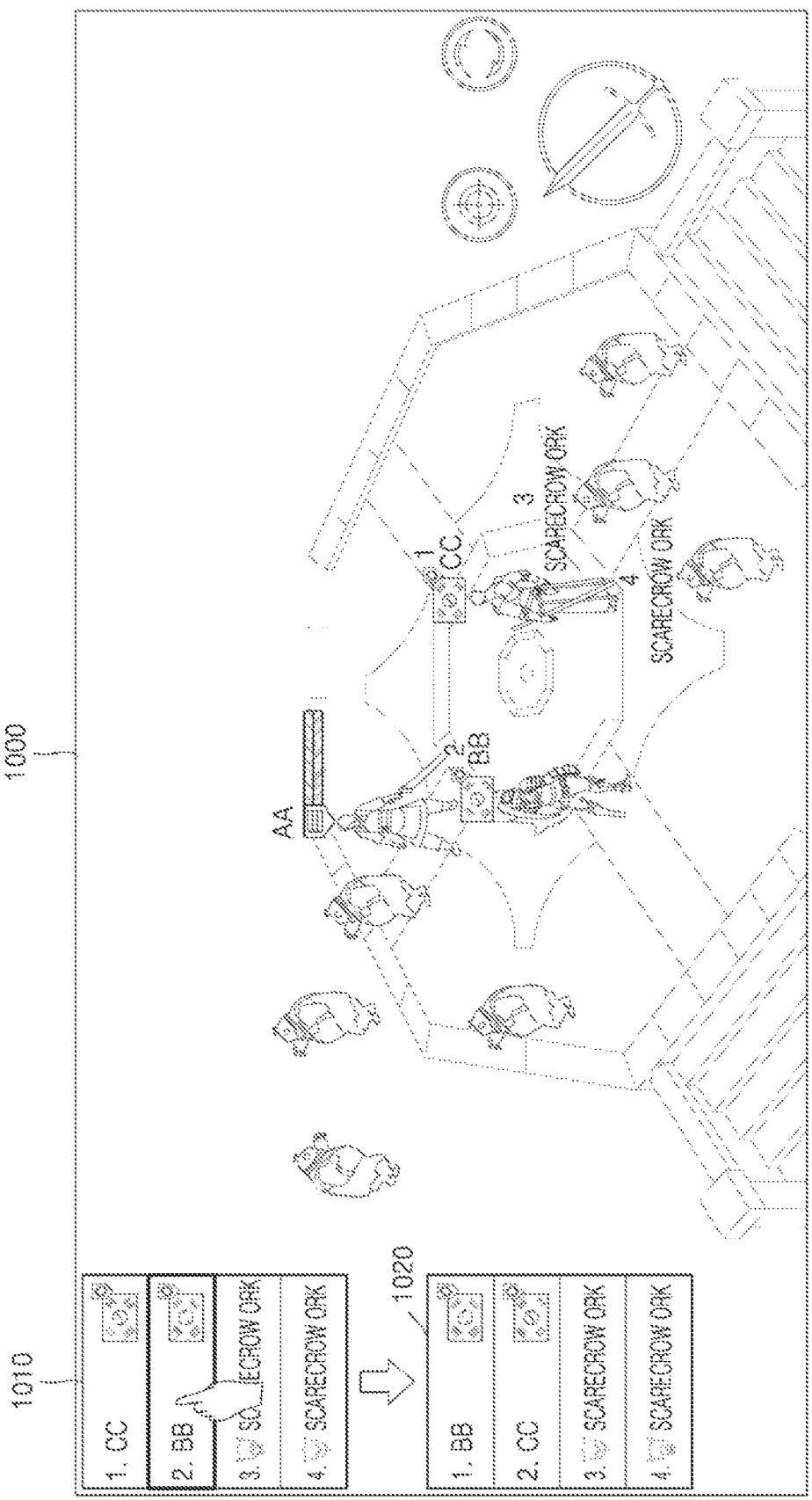
FIG. 10 is a diagram illustrating an example of changing an order among objects by an additional input from a user.

FIG. 10 is a diagram illustrating an example of changing an order among objects by an additional input from a user.

A screen 1000 illustrated in FIG. 10 may be identical to the screen 500 of FIG. 5B.

With reference to a list 1010 of FIG. 10, objects included in a targeting area may be in a priority order of a character named CC, a character named BB, and then scarecrow orks, based on priority information preset by the user and a distance between a center point and each object.

At this time, the user may separately select the character named BB through an interface unit. The method of separately selecting the character named BB by the user may include clicking a shape of a second character using a mouse by the user; however, the present disclosure is not limited thereto. When the user separately selects the character named BB, the character named BB may have the highest priority and an order among the objects may be changed. Accordingly, the list 1010 displayed on the screen 1000 in FIG. 10 may be changed to a list 1020 showing a priority order of the character named BB, the character named CC, and then the scarecrow orks.

Figure 11:
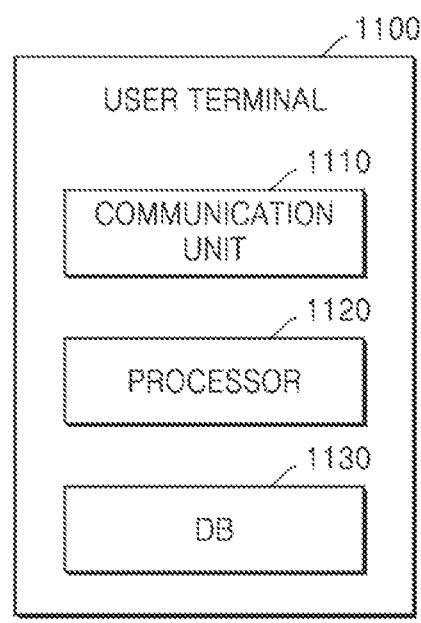
FIG. 11 is a flowchart illustrating an example of a block diagram of a server.

FIG. 11 is a flowchart illustrating an example of a block diagram of a server.

A user terminal 1100 of FIG. 11 may be identical to the user terminal 1000 of FIG. 1.

With reference to FIG. 11, the user terminal 1100 may include a communication unit 1110, a processor 1120, and a DB 1130. The user terminal 1100 of FIG. 11 only shows components related to the embodiments. Accordingly, a person skilled in the art may understand that other generalpurpose components may be further included in addition to the components illustrated in FIG. 11.

The communication unit 1110 may include one or more components for wired/wireless communication with other nodes. For example, the communication unit 1110 may include at least one of a near field communication unit (not shown), a mobile communication unit (not shown), and a broadcast receiver (not shown). For example, the communication unit 1110 may transmit data including information necessary for game playing to the game server 2000, and receive a result of data processing from the game server 2000.

The DB 1130 may be a hardware in which various data processed in the user terminal 1000 is stored, and may store a program for processing and control by the processor 1120. The DB 1130 may store payment information, user information, etc.

The DB 1130 may include random access memory (RAM), such as dynamic random access memory (DRAM) and static random access memory (SRAM), read-only memory (ROM), electrically erasable programmable read-only memory (EEPROM), a CD-ROM, a blu-ray disc, or other optical disc storages, a hard disk drive (HDD), a solid state drive (SSD), or flash memory.

The processor 1120 may control overall operations of the user terminal 1100. For example, the processor 1120 may execute programs stored in the DB 1130 to control in general an input unit (not shown), a display (not shown), the communication unit 1110, the DB 1130, etc. For example, the processor 1120 may control the communication unit 1110 to display a result of data processing received from the game server 2000 on the display.

The processor 1120 may execute programs stored in the DB 1130 to control operations of the user terminal 1100. The processor 1120 may control at least some of the operations of the user terminal 1110 described with reference to FIGS. 1 to 10.

The processor 1120 may be implemented by application specific integrated circuits (ASICs), digital signal processors (DSPs), digital signal processing devices (DSPDs), programmable logic devices (PLDs), field programmable gate arrays (FPGAs), controllers, micro-controllers, microprocessors, and other electric units for performing functions.

The embodiments according to the present disclosure may be implemented in the form of a computer program which can be executed in a computer through various components, and such computer program may be recorded on a computer-readable medium. At this time, the medium may include a magnetic medium, such as a hard disk, a floppy disk, and a magnetic tape, an optical recording medium, such as a CD-ROM and a DVD, a magneto-optical medium, such as a floptical disk, a hardware device specially configured to store and execute program instructions, such as read-only memory (ROM), random-access memory (RAM), flash memory, etc.

Meanwhile, the computer program may be specifically designed and configured for the present disclosure, or may be publicly known to those skilled in the art of computer software. Examples of the computer program may include not only machine language codes generated by a compiler but also computer-executable high level language codes generated by using an interpreter, etc.

According to an embodiment, the method of various embodiments of the present disclosure may be included and provided in a computer program product. The computer program product may be a commodity and be traded between a seller and a buyer. The computer program product may be distributed in the form of a machine-readable storage medium (e.g., compact disc read only memory (CD-ROM), or directly or indirectly distributed online (e.g., download or upload) through an application store (e.g., Playstore™) or between two user devices. In the case of online distribution, at least a part of the computer program product may be temporarily stored or generated in a machine-readable storage medium such as a server of a manufacturer, a server of an application store, or memory of a relay server.

According to an embodiment of the present disclosure, the game server may form a targeting area based on the first input from the user and automatically attack objects located in the targeting area without a further operation of the user, which may lead to enhanced convenience in targeting.

According to another embodiment of the present disclosure, the game server may determine an attack order among the objects based on preset priority information regarding types of the objects included in the targeting area, which may lead to an improved targeting speed.

According to another embodiment of the present disclosure, the game server may move in real-time the targeting area so that an object the user intends to attack is located in the targeting area, which may be an optimized targeting method in an MMORPG.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A method of targeting an object in a game, the method comprising:
    setting a first center point of a first targeting area based on a first input from a user;
    displaying the first targeting area surrounded by a closed curve around the first center point on a screen of a user terminal;
    displaying a list enumerating a first plurality of objects located in the first targeting area on the screen; and
    moving the first targeting area based on a second input by the user received after the first input,
    wherein the displaying of the list on the screen includes:
    based on the first plurality of objects being located in the first targeting area, receiving priority information preset by the user regarding types of the first plurality of objects;
    determining an order among the first plurality of objects based on the priority information; and
    displaying the list based on the determined order.

2. The method of claim 1, wherein
    the first input is a long-press input made by touching a first position on the screen over preset time, and
    the first targeting area is surrounded by a first circular closed curve apart from the first position, as the first center point, at a first distance.

3. The method of claim 2, further comprising displaying on the screen a second targeting area, which is moved in parallel with the first targeting area,
    wherein the second input is an input of dragging on the screen a touch point to a second position, which is different from the first position, and the second targeting area is surrounded by a second circular closed curve apart from the second position, as a second center point, at the first distance.

4. The method of claim 3, further comprising,
when the second input is finished, automatically attacking at least one second object included in the second targeting area, wherein the second input is finished when a touch on the screen is released during the input of dragging.

5. The method of claim 3, wherein the second targeting area is displayed simultaneously with the first targeting area.

6. The method of claim 1, wherein the determining of the order includes, when a second plurality of objects of a same type are located in the first targeting area, determining the order with respect to each of the second plurality of objects based on a distance between each of the second plurality of objects and the first center point.

7. The method of claim 1, further comprising:
displaying at least one first object located in the first targeting area by changing a color thereof to be distinguished from a third plurality of objects which are not located in the first targeting area; and
marking a position adjacent to a third object having a highest priority among the at least one first object with a shape distinguishable from a shape of the third object.

8. The method of claim 1, wherein the list is displayed as an element separate from the first targeting area.

9. An apparatus executing a game, the apparatus comprising:
a memory in which at least one instruction is stored; and
at least one processor configured to read the at least one instruction that, when executed, cause at least one of the at least one processor to cause the apparatus to:
set a first center point of a first targeting area based on a first input from a user;
display the first targeting area surrounded by a closed curve around the first center point on a screen of a user terminal;
display a list enumerating a first plurality of objects located in the first targeting area on the screen; and
move the first targeting area based on a second input by the user received after the first input,
wherein at least one of the at least one processor is configured to execute the at least one instruction to cause the apparatus to:
based on the first plurality of objects being located in the first targeting area, receive priority information preset by the user regarding types of the first plurality of objects;
determine an order among the first plurality of objects based on the priority information; and
display the list based on the determined order.

10. The apparatus of claim 9, wherein the first input is a long-press input made by touching a first position on the screen over preset time, and
wherein the first targeting area is surrounded by a first circular closed curve apart from the first position, as the first center point, at a first distance.

11. The apparatus of claim 10, wherein at least one of the at least one processor is configured to execute the at least one instruction to cause the apparatus to display on the screen a second targeting area, which is moved in parallel with the first targeting area,
wherein the second input is an input of dragging on the screen a touch point to a second position, which is different from the first position, and
wherein the second targeting area is surrounded by a second circular closed curve apart from the second position, as a second center point, at the first distance.

12. The apparatus of claim 11, wherein at least one of the at least one processor is configured to execute the at least one instruction to cause the apparatus to, based on the second input being finished, automatically attack at least one second object included in the second targeting area, and
wherein the second input is finished when a touch on the screen is released during the input of dragging.

13. The apparatus of claim 9, wherein at least one of the at least one processor is configured to execute the at least one instruction to cause the apparatus to, based on a second plurality of objects of a same type being located in the first targeting area, determine the order with respect to each of the second plurality of objects based on a distance between each of the second plurality of objects and the first center point.

14. The apparatus of claim 9, wherein at least one of the at least one processor is configured to execute the at least one instruction to cause the apparatus to:
display at least one first object located in the first targeting area by changing a color thereof to be distinguished from a third plurality of objects which are not located in the first targeting area; and
mark a position adjacent to a third object having a highest priority among the at least one first object with a shape distinguishable from a shape of the third object.

15. A non-transitory computer-readable record medium on which at least one instruction is stored, which, when executed by at least one processor, causes the at least one processor to:
set a first center point of a first targeting area based on a first input from a user;
display the first targeting area surrounded by a closed curve around the first center point on a screen of a user terminal;
display a list enumerating a plurality of objects located in the first targeting area on the screen; and
move the first targeting area based on a second input by the user received after the first input,
wherein the at least one processor configured to execute the at least one instruction to:
based on the plurality of objects being located in the first targeting area, receive priority information regarding the plurality of objects;
determine an order among the plurality of objects based on the priority information; and
display the list based on the determined order.

* * * * *